United States Patent [19]

Plettner

[11] 3,888,812
[45] June 10, 1975

[54] PROCESS FOR THE MANUFACTURE OF AQUEOUS EPOXIDE RESIN EMULSIONS

[75] Inventor: Wolfram Plettner, Glinde, Germany

[73] Assignee: Hoechst Aktiengesellschaft, Frankfurt, Germany

[22] Filed: July 18, 1973

[21] Appl. No.: 380,390

[30] Foreign Application Priority Data
July 25, 1972   Switzerland...................... 11104/72

[52] U.S. Cl.......... 260/24; 260/19 EP; 260/29.2 EP
[51] Int. Cl............................ C08c 9/18; C08d 3/40
[58] Field of Search............ 260/19 EP, 24, 29.2 EP

[56] References Cited
FOREIGN PATENTS OR APPLICATIONS
1,244,424   9/1971   United Kingdom.......... 260/29.2 EP
2,049,645   8/1971   France ......................... 260/29.2 EP
1,669,772   9/1972   Germany...................... 260/29.2 EP
865,727   4/1961   United Kingdom.......... 260/29.2 EP
1,575,303   6/1969   France ......................... 260/29.2 EP

*Primary Examiner*—Melvyn I. Marquis
*Assistant Examiner*—William Parker
*Attorney, Agent, or Firm*—Gordon W. Hueschen

[57] ABSTRACT

The present invention relates to a process for the manufacture of aqueous emulsions of epoxy resins, having a content of water of 50 to 70 percent by weight relative to the total amount of the emulsion, by emulsifying liquid epoxy resins or epoxy resins respectively, which are liquid between 20° and 80°C, using water in the presence of emulsifiers, characterised in that 0.5 – 15 percent by weight, relative to the total amount of emulsified mixture, of an emulsifier mixture.

10 Claims, No Drawings

PROCESS FOR THE MANUFACTURE OF AQUEOUS EXPOXIDE RESIN EMULSIONS

CROSS-REFERENCE TO RELATED APPLICATION

Applicants claim priority of Application filed July 25, 1972, in the Patent-Office of Switzerland.

BACKGROUND OF THE INVENTION

1. Field of the invention

The invention relates to a process for the manufacture of stable aqueous emulsions of epoxide resins. Possible ways of manufacturing aqueous epoxide resin emulsions are known.

It is an object of the present invention to provide stable aqueous emulsions of liquid resins or such epoxide resins, which are present in liquid phase at a temperature of 80° C, with a water contents of 50 percent by weight or more, relative to the total weight of the emulsion, which emulsions are to be stable at 20° C for at least 3 months without separation of phases.

2. Prior Art

The invention relates to a process for the manufacture of stable aqueous emulsions of epoxide resins. Possible ways of manufacturing aqueous epoxide resin emulsions are known.

German Patent 1,080,513 discloses that polyepoxides may be emulsified or dispersed in water with the acid of certain non-ionic emulsifiers. The storage stability of these emulsions was so low, however, that additionally to the emulsifier a binding colloid had to be added necessarily. U.S. Pat. No. 3,069,376 discloses the production of epoxy resin emulsions, however, using also protective colloids (compare Example 14).

Canadian Patent Specification 879,750 describes emulsifier mixtures of nonylphenoxypoly-(ethoxy)$_{19}$-ethanol and alkylphenol polyglycol ethers with 4 – 9 mols of added-on alkylene oxide, for the manufacture of aqueous epoxide resin emulsions. The amounts of emulsifier used vary between 12 % and 14 %.

This does not ensure that the coatings manufactured therewith are sufficiently insensitive to water.

Japanese Patent Specification 29,625-71 specifies, as an emulsifier for epoxide resins, a mixture of polyoxyalkylenes obtained from alkylene oxide and propylene oxide and alkylphenol polyglycol ethers, in an amount of 0.5 – 2.5 % by weight relative to the epoxide resin.

The process has the disadvantage that during the combination with epoxide resin curing agents necessary for curing the emulsion tends to phase separation and hence perfect protective coatings are not obtained.

Austrian Patent Specification 286,647 and also German Displayed Specification 1,669,772 describes, as a non-ionic emulsifier, an addition product of 25 – 30 mols of alkylene oxide to abietic acid, for the manufacture of aqueous epoxide resin dispersions. Stable aqueous emulsions, which can be kept for a prolonged period without phase separation, are only obtainable with the process indicated at the indicated preferred epoxy resin content of 70 – 80 % of the aqueous phase. If more water is introduced, such as is desired for industrial use, the storage stability of the emulsions is substantially lowered.

It is an object of the present invention to provide stable aqueous emulsions of liquid epoxide resins or such epoxide resins, which are present in liquid phase at a temperature of 80° C, with a water contents of 50 percent by weight or more, relative to the total weight of the emulsion, which emulsions are to be stable at 20° C for at least 3 months without separation of phases.

SUMMARY

The present invention relates to a process for the manufacture of aqueous emulsions of epoxy resins, having a content of water of 50 to 70 percent by weight relative to the total amount of the emulsion, by emulsifying liquid epoxy resins or epoxy resins respectively, which are liquid between 20° and 80° C, using water in the presence of emulsifiers, characterised in that 0.5 – 15 percent by weight, relative to the total amount of emulsified mixture, of an emulsifier mixture consisting of a. 30 – 50 percent by weight of abietic acid polyglycolester,
b. 20 – 40 percent by weight of polyglycolethers of fatty alcohols and/or
b. polyglycolethers of p-alkylphenol and
c. 10 – 30 percent by weight of long chain aliphatic alcohols of 8 – 18 carbon atoms, wherein the sum of the individual emulsifier components (a), (b), (b') and (c) have to add up to 100 percent by weight.

In combination with suitable curing agent compounds, such as for example aliphatic, cycloaliphatic or aromatic di-, tri-, or other polyamines used preferably for cold curing, as well as organic acid anhydrides, which need to be cured by a hot curing method, the epoxide resin emulsions of the invention, when applied as a coating or covering to a carrier, give water insensitive, smooth, firm coatings. The "pot life" of epoxide resin emulsions, to which a curing agent for epoxide resins has been added, has to be formulated such or chosen so that the water has evaporated mainly before hardening.

The emulsifier mixture explained above can be used to emulsify in principle all monofunctional and polyfunctional epoxide compounds, provided these are water-immiscible, individually or as mixtures with one another. Particular industrial interest attaches to the emulsification of polyfunctional epoxide compounds with more than one 1,2-epoxy group, which are converted by suitable known curing agents into plastics.

The method according to the invention permits the addition of fillers, for example bitumen or tar, before emulsifying the epoxide resins in water. This does not decisively impair the storage stabilities of the aqueous epoxide resin dispersion. The emulsions containing fillers, yield cured coatings after admixture of customary epoxide curing agents and after being spread in a layer of greater or lesser thickness.

Polyamidoamines, the condensates of dimeric fatty acids or oligomeric fatty acids from fatty acids and vinyl compounds, especially styrene, and alkylenepolyamines such as, for example, diethylenetriamine or triethylenetetramine, are particularly suitable for curing the epoxide resins in the aqueous dispersion. Such products are described, for example, in U.S. Pat. No. 3,139,437, British Patent Specification 803,517, British Patent Specification 988,738 and German Offenlegungsschrift 1,745,322.

These polyamidoamines have amine numbers of 80 – 450 and viscosities of 150 – 30,000 cP (25°C).

New association compounds, which are described in the Swiss patent application of the same dates of file reference 11,106/72, are particularly suitable for use as curing agents.

Amongst the large number of epoxide compounds which contain more than one 1,2-epoxide group in the molecule and which can be reacted according to the invention to give emulsions, the following examples may be mentioned: the epoxides of multiple-unsaturated hydrocarbons (vinylcyclohexene, dicyclopentadiene, cyclohecadiene (sic), cyclododecadiene, cyclododecatriene, isoprene, 1,5-hexadiene, butadiene, polybutadiene, divinylbenzenes and the like), oligomers of epichlorohydrin and similar epoxy-ethers of polyhydric alcohols, polyglycols, (glycerine, pentaerythritol, sorbitol, polyvinyl alcohol, polyallyl alcohol and the like) (sic), epoxy-ethers of polyhydric phenols (resorcinol, hydroquinone, bis-(4-hydroxyphenyl)-methane, bis-(4-hydroxy-3-methylphenyl)methane, bis-(4-hydroxy-3,5-dichlorophenyl)-methane, bis-(4-hydroxy-3,5-dibromophenyl)-methane, bis-(4-hydroxy-3,5-difluorophenyl)-methane, 1,1-bis-(4-hydroxyphenyl)-ethane, 2,2-bis-(4-hydroxyphenyl)-propane, 2,2-bis-(4-hydroxy-3-methylphenyl)-propane, 2,2-bis-(4-hydroxy-3-chlorophenyl)propane, 2,2-bis-(4-hydroxy-3,5-dichlorophenyl)-propane, bis-(4-hydroxyphenyl)-phenyl-methane, bis-(4-hydroxyphenyl)diphenylmethane, bis-(4-hydroxyphenyl)-4'-methylphenylmethane, 1,1-bis-(4-hydroxyphenyl)-2,2,2-trichloroethane, bis-(4-hydroxyphenyl)-(4-chlorophenyl)-methane, 1,1-bis-(4-hydroxyphenyl)-cyclohexane, bis-(4-hydroxyphenyl)cyclohexylmethane, 4,4'-dihydroxydiphenyl, 2,2'-dihydroxydiphenyl, 4,4'-dihydroxydiphenylsulphone and their hydroxyethyl ethers, and phenol-formaldehyde condensation products, such as phenol-alcohols, phenol-aldehyde resins and the like), epoxides containing S and N (N,N-diglycidylaniline, or N,N'-dimethyldiglycidyl-4,4-diaminodiphenylmethane), as well as epoxides which have been manufactured according to customary processes from poly-unsaturated carboxylic acids or mono-unsaturated carboxylic acid esters of unsaturated alcohols, glycidyl esters and polyglycidyl esters which are obtainable by polymerisation or copolymerisation of glycidyl esters of unsaturated acids, or which are obtainable from other acid compounds (cyanuric acid, diglycidyl sulphide, cyclic trimethylenetrisulphone or their derivatives).

Instead of the abovementioned pure epoxides, their mixtures, and also mixtures with monoepoxides, can equally well be reacted according to the present process, optionally in the presence of solvents or plasticisers. Thus, for example, the following monoepoxides can be used as mixtures with the abovementioned epoxide compounds: epoxidised unsaturated hydrocarbons (butylene oxide, cyclohexene oxide, styrene oxide and others), epoxides containing halogen such as, for example, epichlorohydrin, epoxy-ethers of monohydric alcohols (methyl alcohol, ethyl alcohol, butyl alcohol, 2-ethylhexyl alcohol, dodecyl alcohol and others), epoxy-ethers of monohydric phenols (phenol, cresol and other phenols substituted in the o- or p-position), glycidyl esters of unsaturated carboxylic acids, epoxidised esters of unsaturated alcohols or unsaturated carboxylic acids, and the acetals of glycidaldehyde.

The epoxide compounds mentioned, which are emulsifiable according to the invention, can furthermore have added to them fillers, dyestuffs, pigments, solvents or plasticisers, as well as curing accelerators, prior to the curing reaction. Additives of particular interest in practice are, for example, titanium dioxide, sand, bitumen and tar products. The emulsions themselves can also be used as additives for concrete or cement.

Epoxide resins which are based on bisphenol A or bisphenol F, of which the epoxide equivalent can be between 160 and 250 and of which the viscosity, measured at 25°C, can be 2,000 to 20,000 cP, are used preferentially. Monofunctional epoxide compounds such as, for example, n-butylglycidyl-ether, 2-ethylhexyl-glycidyl-ether, cresyl-glycidylether and p-tert.-butylphenyl-glycidyl-ether, are mainly of importance as reactive diluents for polyfunctional, more highly viscous, epoxide compounds.

EXAMPLE 1

4 g of a condensation product of abietic acid and 30 mols of ethylene oxide, 1.5 g of a condensation product of p-nonylphenol and 30 mols of ethylene oxide, 1.5 g of a condensation product of p-nonylphenol and 4 mols of ethylene oxide and 2 g of dodecanol are added to 100 g of a mixture of 87.5 g of an epoxide resin, based on bisphenol A and having a viscosity of 10,000 cP and an epoxide equivalent of 190, and 12.5 g of n-butyl glycidyl ether, whilst gently warming to 40°C, and are homogeneously distributed by stirring.

Sufficient water is emulsified in a portion of this preparation, whilst stirring, to give a water content of 50% by weight in the emulsion. Sufficient water to give a water content of 60% by weight is emulsified in another part, in the same manner.

Both emulsions are tested for their storage stability at room temperature.

1. Dispersion with 50% by weight of water: sedimentation takes place after 12 weeks.
2. Dispersion with 60% by weight of water: sedimentation takes place after 24 weeks.

EXAMPLE 2

4 g of abietic acid ethoxylated with 30 mols of ethylene oxide, 1.5 g of a condensation product of p-nonylphenol with 30 mols of ethylene oxide, 1.5 g of a condensation product of p-nonylphenol with 4 mols of ethylene oxide and 2 g of dodecanol are added to 100 g of an epoxide resin based on bisphenol A, having a viscosity of 9,000 cP and an epoxide equivalent of 180, in the manner indicated in Example 1, and the mixture is stirred. Sufficient water is emulsified in this preparation to give a total water content of 60% by weight in the emulsion. The emulsion thus obtained is stable for 12 weeks.

EXAMPLE 3

Analogously, 2 g of a condensation product of abietic acid with 30 mols of ethylene oxide, and 2 g of a condensation product of p-nonylphenol with 23 mols of ethylene oxide, as well as 2 g of dodecyl alcohol, are added to 100 g of an epoxide resin having a viscosity of 12,000 cP and an epoxide equivalent weight of 190, based on bisphenol and epichlorohydrin, and the mixture is then homogenised. Thereafter, sufficient water is emulsified in this charge to give a water content of 50% by weight. The emulsion thus obtained is stable for 6 weeks.

EXAMPLE 4

2 g of a condensation product of abietic acid and 30 mols of ethylene oxide, 0.25 g of an addition product of p-nonylphenol and 30 mols of ethylene oxide, 1.25 g of a condensation product of p-nonylphenol and 4 mols of ethylene oxide and 1 g of dodecyl alcohol are stirred into 100 g of an 80% strength by weight solution of an epoxide resin having a viscosity of 100–170 cP (measured at 40% strength in butyldiglycol at 20° C and an epoxide equivalent of 450–525, in xylene. By emulsifying water in this charge, it is possible to produce an emulsion in which the weight of water amounts to 50% by weight and which has a storage stability of 10 hours.

EXAMPLE 5

An emulsifier mixture of 3 g of an addition product of 30 mols of ethylene oxide to abietic acid (or colophony), 2 g of an addition product of 30 mols of ethylene oxide to p-nonylphenol, 2 g of an addition product of 8 mols of ethylene oxide to 1 mol of p-nonylphenol and 2 g of n-dodecyl alcohol is added to a mixture of 77.5 g of epoxide resin based on bisphenol A and epichlorohydrin, having an epoxide equivalent of weight of approx. 190 and a viscosity of approx. 10,000 cP at 20°C, 11.5 g of n-butyl glycidyl ether and 10 g of a glycidyl ether trimethylolpropane, and the mixture is stirred until homogeneous.

An emulsion containing 50% by weight of water is prepared from this charge by adding the appropriate amount of water. This emulsion is stored at 50°C and is stable for more than 48 hours.

EXAMPLE 6

9 g of an emulsifier mixture of 3 g of an addition product of 25–30 mols of ethylene oxide to abietic acid (or colophony), 2 g of an addition product of 4 mols of ethylene oxide to p-nonylphenol, 2 g of an addition product of 30 mols of ethylene oxide to p-nonylphenol and 2 g of n-dodecyl alcohol are added to 100 g of an epoxide resin based on bisphenol A and epichlorohydrin, having an epoxide equivalent weight of approx. 185 and a viscosity of 8,000 cP at 20°C and are homogeneously distributed, whilst stirring.

Sufficient water is slowly added to this batch, whilst stirring, that the emulsions produced respectively have an epoxide resin content of 80% by weight, 60% by weight or 45% by weight. The emulsions obtained are stable for at least 52, 10 or 6 weeks, respectively.

EXAMPLE 7

9 g of an emulsifier mixture which consists of 4 g of an addition product of 25–30 mols of ethylene oxide to 1 mol of abietic acid, 1.5 g of an addition product of 30 mols of ethylene oxide to 1 mol of p-nonylphenol, 1.5 g of an addition product of 10 mols of ethylene oxide to 1 mol of p-nonylphenol and 2 g of n-dodecyl alcohol are added to 100 g of an epoxide resin mixture consisting of 88% by weight of a polyglycidyl ether based on bisphenol A and epichlorohydrin, having an epoxide equivalent weight of 185 and a viscosity of 9,000 cP, and 12% by weight of 2-ethylhexyl-glycidyl ether.

The resin-in-water emulsion is prepared by adding water, whilst stirring. At a water content of 50% by weight, the storability and usability of the emulsion are very good.

EXAMPLE 8

A homogeneous solution is prepared, whilst stirring and gently warming if necessary, from 95 g of a trimethylol-propane-glycidyl-ether having an epoxide equivalent of 152 and a viscosity of 170 cP measured at 25°C, and an emulsifier mixture which consists of 4 g of an ethoxylation product of abietic acid which contains 25–30 mols of added-on ethylene oxide per mol of acid, 1.5 g of an addition product of 20–25 mols of ethylene oxide to p-nonylphenol, 1.5 g of an ethoxylation product of 1 mol of nonylphenol and 9–11 mols of ethylene oxide and 2 g of 1-dodecanol.

65 g of water are slowly incorporated into this epoxide resin preparation, whilst stirring. A stable emulsion is produced, which after 10 hours shows about 2% of supernatant dispersion-free aqueous phase and then keeps unchanged. The dispersion-free aqueous phase can be separated from the emulsion in a known manner and can then be used in further emulsifications of trimethylolpropane-glycidyl-ether, in place of water or mixed therewith.

EXAMPLE 9

5 g of an emulsifier mixture consisting of 4 g of an addition product of 25–30 mols of ethylene oxide to 1 mol of abietic acid, 1.5 g of an ethoxylation product of p-nonylphenol which contains 20–25 mols of ethylene oxide, 1.5 g of an alkylpolyglycol ether with 12–14 C atoms in the alkyl chain and containing 6–10 mols of ethylene oxide, and 2 g of n-dodecanol, are homogeneously stirred into 95 g of bis-(3,4-epoxy-6-methylcyclohexylmethyl) adipate having an epoxide equivalent of 210 and a viscosity of 900 cP, measured at 25°C. 100 g of water are added, whilst stirring. A dispersion is obtained, which after 2 days shows a small amount of dispersion-free aqueous phase, and the latter can be used for further emulsifications of bis-(3,4-epoxy-6-methylcyclohexylmethyl) adipate. The emulsion itself is thereby concentrated to 55% by weight and remains stable in this form for more than 4 weeks.

Pigments, such as, for example, titanium dioxide (and fillers such as quartz powder or quartz sand) can be added to the epoxide resin/emulsifier preparation before emulsification with water.

The use of the emulsifier mixture mentioned in Example 7 also makes it possible to add bitumen to the epoxide resin before emulsification.

The epoxide resin emulsions were converted into a dispersion paint, pigmented white, in the manner shown below, and the paint was applied to phosphatised iron sheets and asbestos-cement sheets.

DISPERSION 1

72 g of an epoxide resin-emulsifier mixture, consisting of 66 g of a mixture of 88% by weight of an epoxide resin based on bisphenol A and epichlorohydrin and having an epoxide equivalent of approx. 186 and a viscosity of 9,000 cP measured at 25°C, and 12% by weight of 2-ethylhexyl-glycidyl-ether, were mixed warm with 6 g of an emulsifier mixture, consisting of 2.67 g of an addition product of 25–30 mols of ethylene oxide to 1 mol of abietic acid, 1 g of an addition product of 30 mols of ethylene oxide to 1 mol of p-nonylphenol, 1 g of an addition product of 10 mols of ethylene oxide to 1 mol of p-nonylphenol and 1.33 g of n-dodecyl alcohol. (This mixture corresponds to the epoxide resin-emulsifier mixture from Example 7 of the present application).

This mixture was ground on a roll mill with 105 g of non-chalking titanium dioxide of the rutile type and 4 g of highly dispersed silica. 66 g of the curing agent according to Example 1, of the application of the same date under the title: "Curing Agents for Aqueous Epoxide Resin Dispersions" Swiss Application, Ser. No. 11,106/72 and 200 g of water were added, using a stirrer.

Corresponding white-pigmented aqueous dispersion paints and coatings were produced using Dispersion 2 and 66 g of the curing agent according to Example 3.

Dispersion 3 and 66 g of the curing agent according to Example 4

Dispersion 4 and 66 g of the curing agent according to Example 5

Dispersion 5 and 66 g of the curing agent according to Example 6 (of the application of the same date, already referred to).

The following data explain the curing agents used for manufacturing the dispersion paint and coatings (association compound) and their production in more detail.

Curing agent for dispersion 1

Production of starting compounds:
Polyamidoamine 1 (component 1a):

A copolymer, manufactured by ionic polymerisation, from 2 mols of isomerised soya oil fatty acid methylester and one mol of styrene, which mainly consists of the dimeric ester and has a saponification number of 190, was reacted with diethylenetriamine by heating to 190° C, to give a polyamidoamine (1a) with the following characteristic data:

| | |
|---|---|
| Viscosity at 25° C | 1,950 cP |
| Amine number | 278 |
| Amine hydrogen equivalent weight | 110 |

Condensation product 1 (component 2):

188 g phenol (2 mols) were fused and 96 g of 44 % strength by weight aqueous formaldehyde solution were added over the course of 15 minutes at approx. 45° C. Thereafter, 272 g of xylylenediamine (2 mols) were added at the same temperature over the course of 30 – 45 minutes. Water was distilled off into a receiver under a vacuum of approx. 15 mm Hg, whilst sumultaneously heating to 105° C. Thereafter the condensation product was left for approximately 30 minutes under a full vacuum at 105° C until a Gardner-Holdt viscosity of $Z_1 - Z_2$ was reached.

A condensation product 1 having the following characteristic data was obtained:

| | |
|---|---|
| Viscosity at 25° C | 2,500 cP |
| Amine number | 490 |
| Amine hydrogen equivalent weight | 73 |

The condensation product mainly consists of a compound of the following formula:

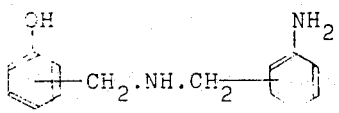

Production of curing agents (association compounds)

183 g of polyamidoamine 1 (component 1a) were warmed to 120° C under a $N_2$ atmosphere. At this temperature, 26.2 g of trimethylolpropane-glycidyl-ether (component 1b) were added uniformly over the course of 3 hours.

The polyamidoamine-epoxide adduct (1) was diluted with 60 g of ethyleneglycolmonoethylether, 26.5 g of the phenolformaldehyde-polyamine condensation product 1 of phenol, formaldehyde and xylylenediamine were added at a temperature of approx. 80° C. The mixture was stirred for 2 hours at a temperature of 100° C. An association compound, which is a curing agent having the following characteristic data, was obtained:

| | |
|---|---|
| Viscosity at 25° C | 3,500 cP |
| Amine number | 225 |
| Solids content | 80 % by weight |
| Amine hydrogen equivalent | 155. |

Curing agent for dispersion 2

The procedure followed was analogous the above data given for curing agent for dispersion 1 but instead of trimethylolpropane-glycidyl-ether (b) the same amount of the glycidyl ether of propoxylated pentaerythritol was employed for the manufacture of this curing agent. An association compound, which may be used as curing agent having the following characteristic data was produced:

| | |
|---|---|
| Viscosity at 25° C | 1,240 cP |
| Amine number | 210 |
| Solids content | 79 % by weight |
| Amine hydrogen equivalent | 152. |

Curing agent for dispersion 3

The procedure followed was analogous to the above data given for curing agent for dispersion 1. The following amounts were reacted: 183 g of polyamidoamine (1) (as component 1a), 20 g of pentaerythritolglycidylether (as component 1b), 57 g of ethyleneglycolmonoethylether and 25.5 g of condensation product 1 of phenol, formaldehyde and xylylenediamine (as component 2). An association compound, which can be used as a curing agent having the following characteristic data was produced:

| | |
|---|---|
| Viscosity at 25° C | 10,700 cP |
| Amine number | 206 |
| Solids content | 79.5 % by weight |
| Amine hydrogen equivalent | 150. |

Curing agent for dispersion 4

The procedure followed was analogous to the above data given for curing agent for dispersion 1. However, the following amounts were reacted: 183 g of polyamidoamine (1) (as component 1a), 13 g of sorbitolglycidyl-ether (as component 1b), 50 g of ethyleneglycolmonoethylether and 25.5 g of condensation product 1 of phenol, formaldehyde and xylylenediamine (as component 2). An association compound, which can be used as a curing agent having the following characteristic data was produced:

| | |
|---|---|
| Viscosity at 25° C | 1,486 cP |

| | |
|---|---|
| Amine number | 226 |
| Solids content | 80.5 % by weight |
| Amine hydrogen equivalent | 137. |

Curing agent for dispersion 5

The procedure followed was analogous to the above data for curing agent for dispersion 1. Instead of trimethylolpropane-glycidyl-ether, the same amount of the glycidyl ether of propoxylated sorbitol (as component 1b) was employed. An association compound, which can be used as a curing agent having the following characteristic data was produced:

| | |
|---|---|
| Viscosity at 25° C | 2,188 cP |
| Amine number | 214 |
| Solids content | 79.5 % by weight |
| Amine hydrogen equivalent | 153. |

The dispersions showed excellent stability over the course of the processing time (that is to say up to the beginning of the crosslinking reaction between the resin component and the curing agent component), which amounted to 2 – 8 hours. These aqueous dispersion paints were applied, in layer thicknesses of approx. 100 μ onto phosphatised iron sheets and asbestos-cement sheets. The technological results are summarised in Table 1 below.

reaction between the resin component and curing agent component), which amounted to 1–10 hours. They are outstandingly suitable for coating concrete and plaster-rendered brickwork.

The technological results are summarised in Table 2 below.

The curing agents numbered as Examples 1 to 13 in Table 2 correspond to those curing agents already mentioned or they are explained below in more detail.

Curing agent according to Example 1 corresponds to curing agent for dispersion 1.

Curing agent according to Example 2

The instructions given for curing agent for dispersion 1 have been followed, but the following amounts were reacted: 183 g of polyamidoamine 2 (component 1a), 38.4 g of trimethylolpropane-glycidylether (component 1b), 63 g of ethyleneglycolmonoethylether and xylenediamine. An association compound, which may be used as a curing agent having the following characteristic data was produced:

| | |
|---|---|
| Viscosity at 25° C | 3,100 cP |
| Amine number | 301 |
| Solids content | 80 % by weight |
| Amine hydrogen equivalent | 155. |

Table 1

| Test on asbestos-cement sheets | Dispersion | | | | |
|---|---|---|---|---|---|
| | 1 | 2 | 3 | 4 | 5 |
| Pot life | 3 hrs | 5 hrs | 1.5 hrs | 7.5 hrs | 5.5 hrs |
| Surface drying | 3 " | 5.5 " | 2 " | 8 " | 6 " |
| Complete curing | approx. 24" | approx. 24" | approx. 18" | approx. 30" | approx. 24" |
| Film formation | ← perfect → | | | | |
| Film levelling | ← satisfactory → | | | | |
| Gloss | good | semi-glossy | good | eggshell gloss | semi-glossy |
| Test on phosphatised iron sheet | | | | | |
| Pendulum hardness after 1 week (according to König) | 105 secs | 90 secs | 110 secs | 88 secs | 97 secs |
| Erichsen deep-drawing value, DIN 53,156 | 4.0 mm | 3.5 mm | 2.5 mm | 4.5 mm | 3.5 mm |
| Whiteness (measured in the Leukometer according to Lange) | −40 | −55 | −43 | −50 | −47 |

Aqueous dispersions were prepared from 100 g of an epoxide resin-emulsifier mixture consisting of 90 g of a mixture of 87.5% by weight of an epoxide resin based on bisphenol A and epichlorohydrin, having an epoxide equivalent of 185 and a viscosity of approx. 9,000 cP measured at 25°C, and 12.5% by weight (sic) of n-butyl-glycidyl-ether, 10 g of trimethylolpropane-glycidyl-ether having a epoxide equivalent of 152, a viscosity of 170 cP measured at 25°C and a total chlorine content of 7.4% by weight, 3 g of an addition product of 25–30 mols of ethylene oxide to 1 mol of abietic acid, 2 g of an addition product of 30 mols of ethylene oxide to 1 mol of p-nonylphenol, 2 g of an addition product of 8 mols of ethylene oxide to 1 mol of p-nonylphenol, 2 g of n-dodecyl alcohol (this mixture corresponds to the epoxide resin-emulsifier mixture from Example 5 of the present invention), 225 g of water and 80 g of one of the curing agents of Examples 1 to 13 of the application of the same date which has already been mentioned. The dispersions show excellent stability over the course of the processing time (that is to say up to the beginning of the crosslinking Curing agent according to Example 3 corresponds to curing agent mentioned above for dispersion 2.

Curing agent according to Example 4 corresponds to curing agent mentioned above for dispersion 3.

Curing agent according to Example 5 corresponds to curing agent mentioned above for dispersion 4.

Curing agent according to Example 6 corresponds to curing agent mentioned above for dispersion 5.

Curing agent according to Example 7

The procedure followed was analogous to the data given above for curing agent for dispersion 1. Instead of trimethylolpropane-glycidyl-ether, the same amount of glycerine-glycidyl-ether (as component 1b) was employed. An association compound, which may be used as a curing agent having the following characteristic data was produced:

| | |
|---|---|
| Viscosity at 25° C | 4,120 cP |
| Amine number | 212 |
| Solids content | 81 % by weight |
| Amine hydrogen equivalent | 158. |

Curing agent according to Example 8

Production of the starting materials (component 2):
Condensation Product 2 (component 2):

297 g of 44 % strength by weight aqueous formaldehyde solution (4.35 mols were added to 960 g of triethylenetetramine (6.15 mols) over the course of 15 – 20 minutes at 40° C, whilst cooling. Thereafter, 579 g of fused phenol (6.15 mols) were added over the course of 15 minutes at the same temperature. Water was distilled off into a receiver under a vacuum of approx. 15 mm Hg, whilst simultaneously heating to 80° C. At 80° C the condensation product was left under full vacuum for approx. 30 minutes until a Gardner-Holdt viscosity of T – U was reached.

A condensation product 2 having the following characteristic data was obtained:

| | |
|---|---|
| Viscosity at 25° C | 885 cP |
| Amine number | 644 |
| Amine hydrogen equivalent weight | 53. |

The condensation product 2 consists mainly of a compound of the following formula:

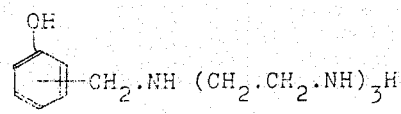

Production of the curing agent

The procedure followed was analogous to the above data for curing agent for dispersion 1. Instead of the condensation product 1 (as component 2) of phenol, formaldehyde and xylylenediamine as component 2, the same amount of condensation product 2 of phenol, formaldehyde and triethylenetetramine was employed. An association compound usable as curing agent having the following characteristic data was produced:

| | |
|---|---|
| Viscosity at 25° C | 1,000 cP |
| Amine number | 260 |
| Solids content | 77 % by weight |
| Amine hydrogen equivalent | 143. |

Curing agent according to Example 9

The procedure followed was analogous to the data given above for curing agent for dispersion 5. Instead of the condensation product 1 (as component 2) of phenol, formaldehyde and xylylenediamine as component 2, the same amount of condensation product 2 of phenol, formaldehyde and triethylenetetramine was employed. An association compound usable as a curing agent having the following characteristic data was produced:

| | |
|---|---|
| Viscosity at 25° C | 1,660 cP |
| Amine number | 252 |
| Solids content | 78 % by weight |
| Amine hydrogen equivalent | 144. |

Curing agent according to Example 10

The procedure followed was analogous to the data mentioned above for curing agent for dispersion 3. Instead of the condensation product 1 (as component 2) of phenol, formaldehyde and triethylenetetramine was employed. An association compound usable as a curing agent having the following characteristic data was produced:

| | |
|---|---|
| Viscosity at 25° C | 3,980 cP |
| Amine number | 248 |
| Solids content | 79 % by weight |
| Amine hydrogen equivalent | 141. |

Curing agent according to Example 11

The procedure followed was analogous to the data given above for curing agent according to Example 7. Instead of the condensation product 1 (as component 2) of phenol, formaldehyde and xylylenediamine as component 2, the same amount of condensation product 2 of phenol, formaldehyde and triethylenetetramine was employed. An association compound usable as a curing agent having the following characteristic data was produced:

| | |
|---|---|
| Viscosity at 25° C | 3,940 cP |
| Amine number | 247 |
| Solids content | 80 % by weight |
| Amine hydrogen equivalent | 148. |

Curing agent according to Example 12

The procedure followed was analogous the data given above for curing agent according to Example 5. Instead of the condensation product 1 (as component 2) of phenol, formaldehyde and xylylenediamine (as component 2), the same amount of condensation product 2 of phenol, formaldehyde and triethylenetetramine was employed. An association compound, usable as a curing agent having the following characteristic data was produced:

| | |
|---|---|
| Viscosity at 25° C | 1,765 cP |
| Amine number | 273 |
| Solids content | 80 % by weight |
| Amine hydrogen equivalent | 129. |

Curing agent according to Example 13

The procedure followed was analogous to the data given above for the production of the curing agent for dispersion 1. Instead of the condensation product 1 (as component 2) of phenol, formaldehyde and xylylenediamine (as component 2), the same amount of condensation product 2 of phenol, formaldehyde and triethylenetetramine was employed. An association compound usable as a curing agent having the following characteristic data was produced:

| | |
|---|---|
| Viscosity at 25° C | 3,240 cP |
| Amine number | 248 |
| Solids content | 80 % by weight |
| Amine hydrogen equivalent | 148. |

Table II

| Dispersion with curing agent | Pot life +) | Surface drying | Complete drying | Erichsen deep-drawing value according to DIN 53,156 | Cross-cut according to DIN 53,153 |
|---|---|---|---|---|---|
| Example 1 | 3.5 hrs. | 5 hrs. | 24 hrs. | 8.7 mm | 1 |
| Example 2 | 3.5 hrs. | 5.5 hrs. | 24 hrs. | 8.9 mm | 1 |
| Example 3 | 5 hrs., 20 min | 6 hrs. | 24 hrs. | 8.3 mm | 1 |
| Example 4 | 1 hr. | 5 hrs. | 20 hrs. | 9.7 mm | 1 |
| Example 5 | 8 hrs. | 15 hrs. | 30 hrs. | 7.5 mm | 1 |
| Example 6 | 5.5 hrs. | 6 hrs. | 24 hrs. | 8.7 mm | 1 |
| Example 7 | 8 hrs. | 22 hrs. | 30 hrs. | 8.6 mm | 1 |
| Example 8 | 4.5 hrs. | 6.5 hrs. | 24 hrs. | 8.9 mm | 1 |
| Example 9 | 4 hrs. | 4.5 hrs. | 24 hrs. | 8.8 mm | 1 |
| Example 10 | 3 hrs. | 4 hrs. | 24 hrs. | 9.3 mm | 1 |
| Example 11 | 3 hrs. | 4 hrs. | 24 hrs. | 8.9 mm | 1 |
| Example 12 | 6 hrs. | 7 hrs. | 24 hrs. | 8.9 mm | 1 |
| Example 13 | 3.5 hrs. | 5 hrs. | 24 hrs. | 8.7 mm | 1 |

The term "pot life" was used to denote the time which elapses until a dispersion of 50 g of the epoxide resin-emulsifier mixture, 50 g of water and 45 g of one of the curing agents of Examples 1 to 13 of the application of the same date, already mentioned, has gelled, or until the viscosity of the dispersion has risen so greatly that it can no longer be processed properly.

A mixture consisting of 80 g of fine-grained quartz powder (particle size 0.5 mm), 160 g of coarse-grained quartz sand, 80 g of cement, 11 g of an epoxide resin-emulsifier mixture corresponding to Example 2 of the present invention and consisting of 10.1 g of an epoxide resin from bisphenol A and epichlorohydrin, having an epoxide equivalent of 185 and a viscosity of 8,900 cP, measured at 25°C, 0.4 g of an addition product of 25–30 mols of ethylene oxide to 1 mol of abietic acid, 0.15 g of an addition product of 30 mols of ethylene oxide to 1 mol of p-nonylphenol, 0.15 g of an addition product of 4 mols of ethylene oxide to 1 mol of p-nonylphenol, 0.2 g of n-dodecyl alcohol and 0.5 g of 2-ethylhexyl-glycidyl-ether, and 8.5 g of the curing agent according to Example 1 of the application of the same date, already mentioned, were homogeneously mixed in a mixing apparatus and stirred with 80 g of water to give a pasty consistency. This composition was applied by means of a knife to give an approximately 5 mm thick concrete floor covering which, after curing, showed excellent resistance to oil and water. The tensile strength, compressive strength and flexural strength of the concrete mixture were improved by 15 to 20% by adding the epoxide resin-curing agent emulsion.

Comparison experiments to demonstrate the technical advance achieved:

Investigation in relation to Austrian Patent Specification 286,647

A. A homogeneous mixture, warmed to 45°–60°C, of 600 g of liquid epoxide resin having an epoxide value of 0.5, a viscosity of approx. 2,500 cP and a molecular weight of about 400, and 30 g of an addition product of 25–30 mols of alkylene oxide to colophony are stirred into 120 g of water which contains 2 g of the same addition product. Rapid circulation of the charge must be ensured. As soon as the water-in-resin emulsion which first forms has changed to a resin-in-water emulsion, the mixture is stirred for a further 10–15 minutes. The resulting emulsion is of 80% strength by weight and is stable on storage for more than 1 year. On further addition of water in order to adjust it to epoxide resin contents of 60 or 45% by weight of epoxide resin, the storage stability decreases considerably, namely to 3 or 1 week. The reduced storage stability manifests itself in the emulsion separating into two phases.

Investigation in relation to Canadian Patent Specification 879,750

B. Analogously to the instructions in Patent Specification 879,750, the same epoxide resin as indicated in Case A is emulsified by stirring 70.9 g of epoxide resin and 22 g of an emulsifier mixture of 60 g of dimethyl phthalate, 20 g of an addition product of 6 mols of alkylene oxide to p-nonylphenol and 20 g of an addition product of 19 mols of alkylene oxide to p-nonylphenol, until the mixture is homogeneous. Thereafter, as in Case A, sufficient water was emulsified into portions of this mixture to give emulsions which contained 80, 60 and 45% by weight of epoxide resin. The emulsions separated into 2 phases after 3 months, 3 days or one-half day, respectively.

Procedure according to the invention

C. Emulsions, manufactured according to the process of the invention, of an epoxide resin identical to those used in Comparison Experiments A and B, which contained, per 100 g of epoxide resin, 7% by weight of an emulsifier mixture, according to the invention, of 4 g of an addition product of 30 mols of alkylene oxide to abietic acid, 1.5 g of an addition product of 30 mols of alkylene oxide to p-nonylphenol, 1.5 g of an addition product of p-nonylphenol and 2 g of n-dodecyl alcohol, the emulsions respectively having an epoxide content of 80, 60 and 45% by weight, show a storage stability, without change, of more than 1 year, 6 months and 6 weeks, respectively.

What is claimed is:

1. In a process for the manufacture of an aqueous emulsion of an epoxide resin, which aqueous emulsion has a water content of 50 to 70 percent by weight relative to the total amount of the emulsion, by emulsifying liquid epoxide resin or an epoxide resin which is liquid between 20° and 80°C using water in the presence of an emulsifier, the improvement which comprises
using as the emulsifier from 0.5 to 15 percent by weight, relative to the total weight of the epoxide resin, of an emulsifier mixture consisting of
a. 30 to 50 percent by weight of an abietic acid polyglycol ester,
b. 20 to 40 percent by weight of an ether selected from the group consisting of a polyglycol ether of a fatty alcohol, a polyglycol ether of a p-alkylphenol, and mixtures thereof, and c. 10 to 30 percent by weight of long chain aliphatic alcohol of 8 to 18 carbon atoms, wherein the sum of the emulsifier components (a), (b) and (c) adds up to 100 percent by weight.

2. Process according to claim 1 wherein the emulsifier mixture comprises a mixture of a. an alkoxylated abietic acid, b. an addition product of an alkylene oxide to p-alkylphenol, and c. an aliphatic alcohol with 8 to 18 carbon atoms.

3. A process according to claim 2 characterized in that the emulsifier compound in (a) is an addition product of 25 to 30 mols of ethylene oxide to 1 mol of abietic acid.

4. A process according to claim 2 characterized in that component (b) is an addition product of 4 to 30 mols of ethylene oxide to a p-alkylphenol.

5. A process according to claim 4 wherein the p-alkylphenol is p-nonylphenol.

6. A process according to claim 2 wherein the emulsifier component (b) is an addition product of 4 to 30 mols of ethylene oxide to an aliphatic alcohol having 8 to 20 carbon atoms.

7. A process according to claim 2 wherein the emulsifier component (c) is an aliphatic alcohol having 12 to 18 carbon atoms.

8. An aqueous emulsion of an epoxy resin prepared by the process of claim 1.

9. A method for stabilizing aqueous dispersions containing from 50 to 70 percent by weight of water, relative to the total amount of emulsion, of liquid epoxide resins or resins which are liquid at 20° to 80°C which comprises using as the emulsifier in the aqueous emulsion of epoxide resin an emulsifier mixture comprising a. 30 to 50 percent by weight of an abietic acid polyglycol ester, b. 20 to 40 percent by weight of an ether selected from the group consisting of a polyglycol ether of a fatty alcohol, a polyglycol ether of a p-alkylphenol, and mixtures thereof, and c. 10 to 30 percent by weight of long chain aliphatic alcohol of 8 to 18 carbon atoms, wherein the sum of the emulsifier components (a), (b) and (c) adds up to 100 percent by weight.

10. The process according to claim 1 wherein the epoxide resin is one which is based upon a dihydric phenol selected from the group consisting of bisphenol A and bisphenol F, which epoxide resin has an epoxide equivalent of between 160 and 250 and a viscosity, measured at 25°C, of between about 2,000 and 20,000 centipoises.

* * * * *

UNITED STATES PATENT OFFICE
CERTIFICATE OF CORRECTION

Patent No. 3,888,812　　　　　　　　　Dated　June 10, 1975

Inventor(s) Wolfram Plettner

It is certified that error appears in the above-identified patent and that said Letters Patent are hereby corrected as shown below:

[54], line 2: "EXPOXIDE" --EPOXIDE--

Patent Column 2, line 20: "b." --b'.--

Signed and Sealed this sixteenth Day of December 1975

[SEAL]

Attest:

RUTH C. MASON
Attesting Officer

C. MARSHALL DANN
Commissioner of Patents and Trademarks